United States Patent [19]

Tokumaru

[11] Patent Number: 4,764,000
[45] Date of Patent: Aug. 16, 1988

[54] TELEPHOTO LENS SYSTEM WITH THREE RELATIVELY SHIFTABLE LENS GROUPS

[75] Inventor: Hisashi Tokumaru, Osaka, Japan

[73] Assignee: Minolta Camera Kabushiki Kaisha, Osaka, Japan

[21] Appl. No.: 864,814

[22] Filed: May 19, 1986

[30] Foreign Application Priority Data

May 20, 1985 [JP] Japan .................................. 60-107173
Sep. 27, 1985 [JP] Japan .................................. 60-215629

[51] Int. Cl.$^4$ .......................... G02B 13/02; G02B 9/00; G02B 9/14
[52] U.S. Cl. ..................................... 350/454; 350/463; 350/475
[58] Field of Search ............... 350/454, 455, 456, 457, 350/463, 475, 482, 483

[56] References Cited

U.S. PATENT DOCUMENTS 4,392,724  7/1983  Hamanishi .
4,435,049  3/1984  Horikawa et al. .
4,483,597  11/1984  Mihara ................................. 350/454
4,666,260  5/1987  Itoh ..................................... 350/454

FOREIGN PATENT DOCUMENTS 57-38408   3/1982  Japan .
57-197507  12/1982  Japan .

Primary Examiner—John J. Corbin
Assistant Examiner—Ronald M. Kachmarik
Attorney, Agent, or Firm—Price, Gess & Ubell

[57] ABSTRACT

A telephoto lens system is provided having a first lens group of a positive refractive power, a second lens group of a negative refractive power with a variable air space, and a third lens group of a positive refractive power with a variable air space. All of the lens groups are shiftable during a focusing operation with the second lens group air space increasing and the third lens group air space decreasing when focusing is effected from infinity to a short distance.

9 Claims, 14 Drawing Sheets

F 2.90

——— d
- - - - SC

-0.5  0.5
Spherical Aberration
Sine Condition

Y'=21.6

- - - - DM
——— DS

-0.5  0.5
Astigmatism

Y'=21.6

-1.0  1.0 %
Distortion eff. F3.90

——— d
- - - - SC

-0.5  0.5
Spherical Aberration
Sine Condition

Y'=21.6

- - - - DM
——— DS

-0.5  0.5
Astigmatism

Y'=21.6

-1.0  1.0 %
Distortion eff. F4.85

——— d
- - - - SC

-0.5  0.5
Spherical Aberration
Sine Condition

Y'=21.6

- - - - DM
——— DS

-0.5  0.5
Astigmatism

Y'=21.6

-1.0  1.0 %
Distortion

F2.90
— d
---- SC
-0.5  0.5
Spherical Aberration
Sine Condition

Y'=21.6
---- DM
—— DS
-0.5  0.5
Astigmatism

Y'=21.6
-1.0  1.0 %
Distortion eff. F3.79
— d
---- SC
-0.5  0.5
Spherical Aberration
Sine Condition Y'=21.6
---- DM
—— DS
-0.5  0.5
Astigmatism Y'=21.6
-1.0  1.0 %
Distortion eff. F4.87
— d
---- SC
-0.5  0.5
Spherical Aberration
Sine Condition Y'=21.6
---- DM
—— DS
-0.5  0.5
Astigmatism Y'=21.6
-1.0  1.0 %
Distortion Spherical Aberration
Sine Condition Astigmatism Distortion Spherical Aberration
Sine Condition Astigmatism Distortion Spherical Aberration
Sine Condition Astigmatism Distortion

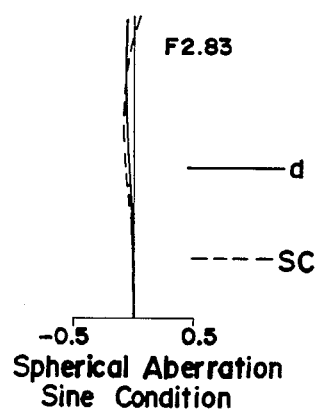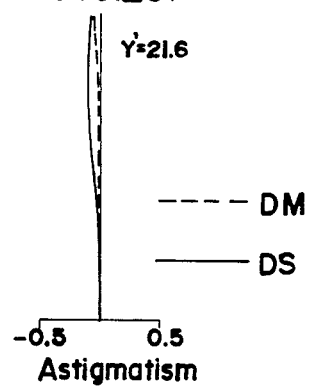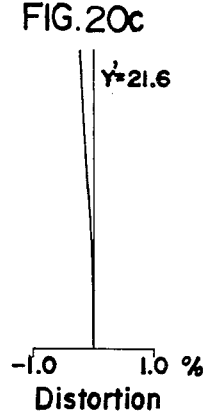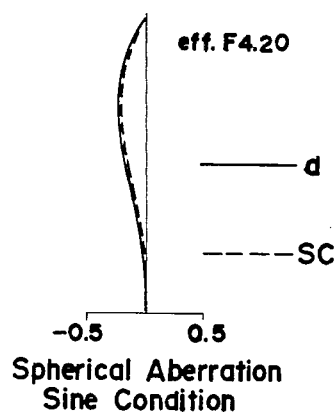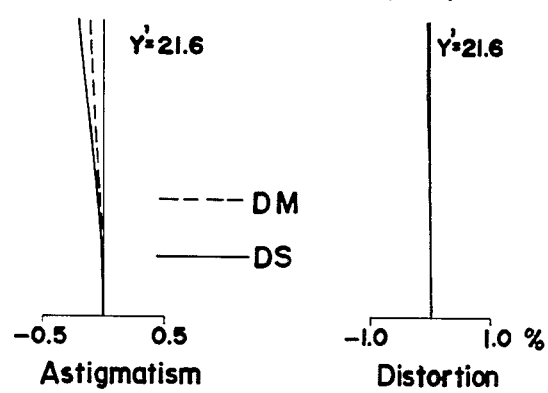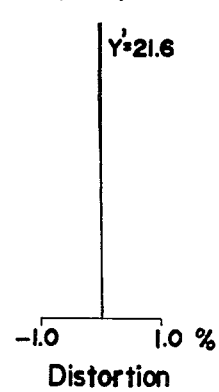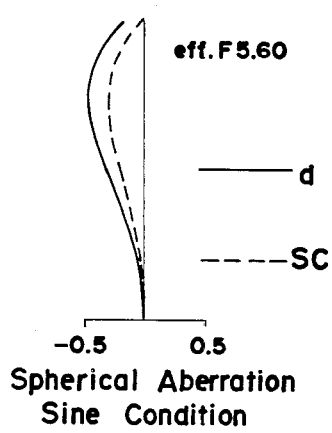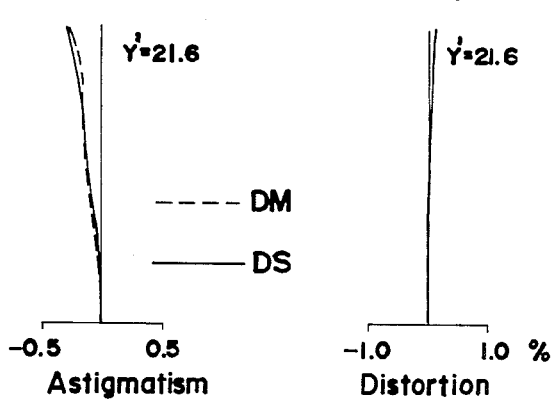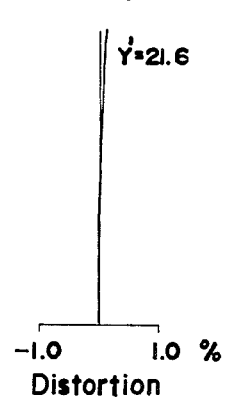

F2.83
— d
---- SC
-0.5  0.5
Spherical Aberration
Sine Condition

Y'=21.6
---- DM
—— DS
-0.5  0.5
Astigmatism

Y'=21.6
-1.0  1.0 %
Distortion eff.F4.24
— d
---- SC
-0.5  0.5
Spherical Aberration
Sine Condition Y'=21.6
---- DM
—— DS
-0.5  0.5
Astigmatism Y'=21.6
-1.0  1.0 %
Distortion eff.F5.80
— d
---- SC
-0.5  0.5
Spherical Aberration
Sine Condition Y'=21.6
---- DM
—— DS
-0.5  0.5
Astigmatism Y'=21.6
-1.0  1.0 %
Distortion

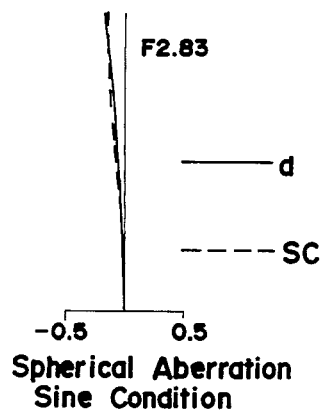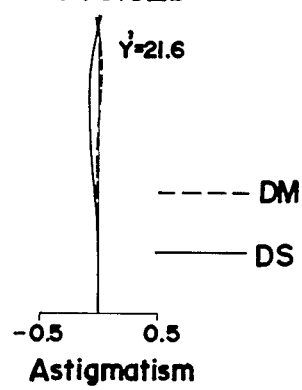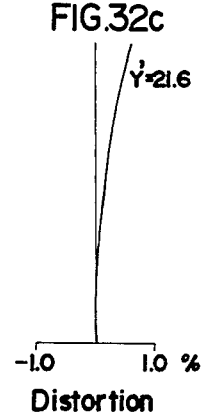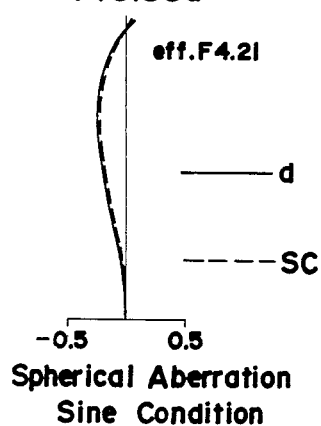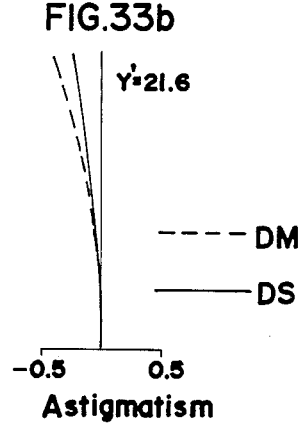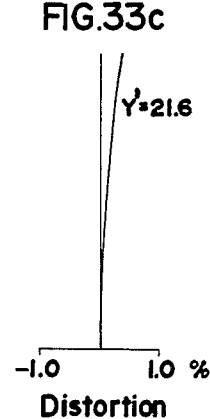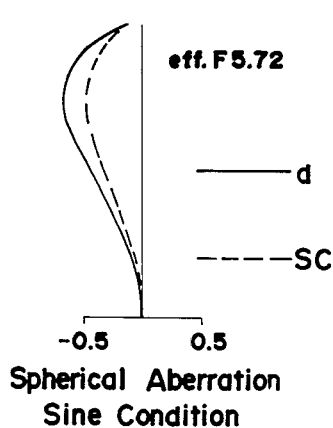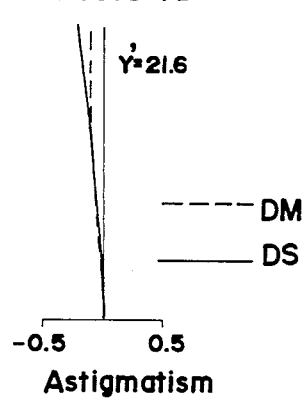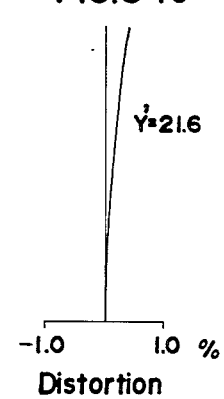

F2.83
—— d
---- SC
-0.5   0.5
Spherical Aberration
Sine Condition

Y'=21.6
---- DM
—— DS
-0.5   0.5
Astigmatism

Y'=21.6
-1.0   1.0 %
Distortion eff.F4.24
—— d
---- SC
-0.5   0.5
Spherical Aberration
Sine Condition Y'=21.6
---- DM
—— DS
-0.5   0.5
Astigmatism Y'=21.6
-1.0   1.0 %
Distortion eff.F5.80
—— d
---- SC
-0.5   0.5
Spherical Aberration
Sine Condition Y'=21.6
---- DM
—— DS
-0.5   0.5
Astigmatism Y'=21.6
-1.0   1.0 %
Distortion F 2.83
— d
---- SC
-0.5    0.5
Spherical Aberration
Sine Condition Y'=21.6
---- DM
— DS
-0.5    0.5
Astigmatism Y'=21.6
-1.0    1.0 %
Distortion eff.F4.24
— d
---- SC
-0.5    0.5
Spherical Aberration
Sine Condition Y'=21.6
---- DM
— DS
-0.5    0.5
Astigmatism Y'=21.6
-1.0    1.0 %
Distortion eff. F5.80
— d
---- SC
-0.5    0.5
Spherical Aberration
Sine Condition Y'=21.6
---- DM
— DS
-0.5    0.5
Astigmatism Y'=21.6
-1.0    1.0 %
Distortion

TELEPHOTO LENS SYSTEM WITH THREE RELATIVELY SHIFTABLE LENS GROUPS

BACKGROUND OF THE INVENTION

1. Field of the Invention

The present invention relates to an interchangeable telephoto lens system, for a single lens reflex camera and more particularly to a telephoto lens system which is capable of continuously effecting infinity distance to a high magnification proximity distance having a focal length of about 100 mm.

2. Description of the Prior Art

So-called macrolenses are known as lenses for short distance photography. In conventional macrolenses, the entire lens system is shifted along the optical axis in its focusing operation. However, in accordance with the development of large aperture macrolenses having focal lengths of about 50 mm and telephoto macrolenses having focal lengths of about 200 mm, various other focusing systems including so-called floating systems, internal focusing systems and rear focusing systems are being proposed. More specifically, various floating systems are applied to large aperture macrolenses having focal lengths of about 50 mm and a F-number of about F/2.8, mainly in order to compensate coma aberration in a short distance focusing condition. On the other hand, internal focusing systems are applied to telephoto macrolenses having focal lengths of about 200 mm for decreasing the lens shifting distance from an infinity focusing position to proximity the focusing position. The reason is that the lens shifting distance reaches about 200 mm if entire the lens system is shifted from an infinity focusing position to a proximity focusing position of high magnification of about $\beta = -1.0$.

In the telephoto macrolenses having focal lengths about 100 mm, a proposal for designing larger aperture telephoto macrolenses with a decreasing lens shifting distance in the focusing operation is disclosed in U.S. Pat. No. 4,392,724. In the proposal, a floating system is applied for extending the aperture, and the lens shifting distance is reduced by increasing the refractive power of the shiftable lens group by locating a negative lens group in the image side of the shiftable lens group. In such a construction, however, the focal length of the whole lens system becomes shorter with an increasing magnification. Therefore, the advantage of the telephoto macrolenses as compared with the standard macrolenses, such as larger working distance, diminished perspective distortion and so on, is reduced. Thus in the proposed telephoto macrolenses these remains the problem that high magnification of $\beta = -1.0$ can not be accomplished, or the above advantage is lost while accomplishing high magnification of $\beta = -1.0$.

SUMMARY OF THE INVENTION

An object of the present invention is to provide a telephoto macro lens system in which the local length of the whole lens system is kept almost constant in the focusing operation to high magnification of $\beta = -'1.0$ for maintaining a proper working distance for telephoto macro lens system, and in which lens shifting distance in the focusing operation can be reduced.

The other object of the present invention is to provide a telephoto macro lens system in which the image forming performance is not changed substantially during its focusing operation, and which is suitable for increasing an aperture.

According to the present invention, a telephoto lens system comprises from the object side to the image side: a first lens group of a positive refractive power; a second lens group of a negative refractive power having a first air space formed between the first and second lens groups; and a third lens group of a positive refractive power having a second air space formed between the second and third lens groups; therein all of the first to third lens groups are shiftable along the optical axis in a focusing operation while enlarging the first air space with decreasing the second air space when focusing is effected from infinity to a short distance; and wherein the lens system fulfills the following conditions:

$$1.1 < f/f_1 < 1.7$$

$$0.15f < D_{23} < 0.4f$$

wherein; f represents a focal length of the whole lens system in an infinity focusing condition; $f_1$ represents a focal length of the first lens group; and $D_{23}$ represents an axial distance of the second air space formed between the second and third lens group in an infinity focusing condition.

The features of the present invention which are believed to be novel are set forth with particularity in the appended claims. The present invention, both as to its organizaiton and manner of operator, together with further objects and advantages thereof, may best be understood by reference to the following description, taken in conjunction with the accompanying drawings.

BRIEF DESCRIPTION OF THE DRAWINGS

FIGS. 20a to 20c represent the aberration curves of the fourth embodiment in infinity focusing condition;

FIGS. 21a to 21c represent the aberration curves of the fourth embodiment in medium focusing condition of $\beta = -0.5$;

FIGS. 22a to 22c represent the aberration curves of the fourth embodiment in proximity focusing condition of $\beta = -1.0$;

FIGS. 32a to 32c represent the aberration curves of the eighth embodiment in infinity focusing condition;

FIGS. 33a to 33c represent the aberration curves of the eighth embodiment in medium focusing condition of $\beta = -0.5$;

FIGS. 34a to 34c represent the aberration curves of the eighth embodiment in proximity focusing condition of $\beta = -1.0$;

DETAILED DESCRIPTION OF THE PREFERRED EMBODIMENTS

Figure 1:
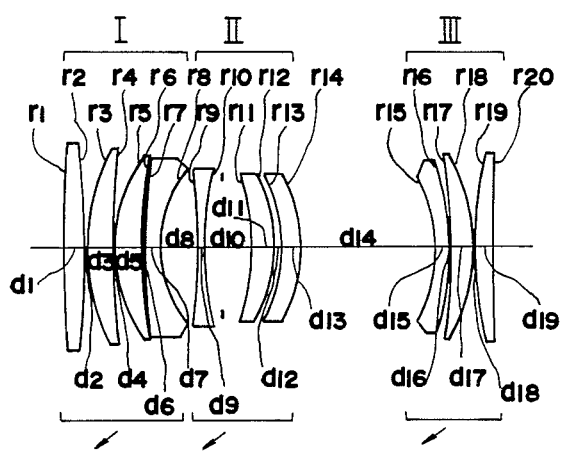
FIG. 1 represents a cross sectional view of the lens system according to a first embodiment of the present invention.

The following description is provided to enable any person skilled in the optical and camera field to make and use the invention and sets forth the best modes contemplated by the inventor for carrying our his invention. Various modifications, however, will remain readily apparent to those skilled in the art, since the generic principles of the present invention have been defined herein specifically to provide a relatively economical and easily manufactured telephoto macro lens system. The derivation of the formulas and the relation of the powers set forth herein can be accomplished with the assistance of a computer. The present invention represents the parameters of a compromise balance of acceptable aberrations which can be relatively easily manufactured to provide a low cost lens system for utilization with a 35 mm SLR camera.

In the drawings, schematic cross sectional views disclose the position of the lens groups and lens elements in the infinity focusing condition with arrows below the lens group representing the directions of their movements in focusing toward the proximity focusing condition. Due to the number of lens elements involved, it was not deemed appropriate to include individual designation of the radii of curvature and axial distances for each lens element and air space. These values, however, are provided in the accompanying tables set forth herein, and the schematic cross sectional views of the respective embodiments follow the normal conventions of an object at the left-hand side of the drawing and the image plane at the right-hand side.

Figure 2:
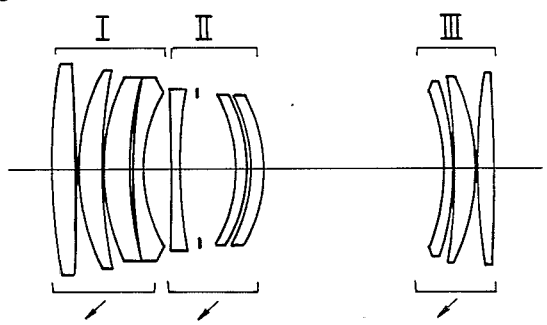
FIG. 2 represents a cross sectional view of the lens system according to a second embodiment of the present invention.
Figure 3:
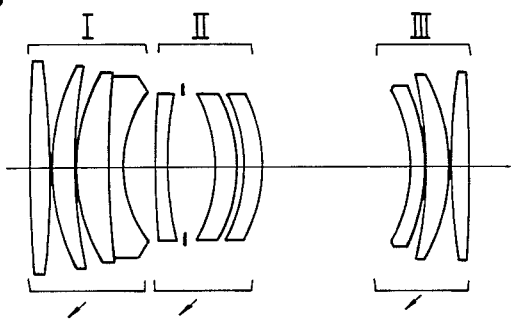
FIG. 3 represents a cross sectional view of the lens system according to a third embodiment of the present invention.
Figure 4:
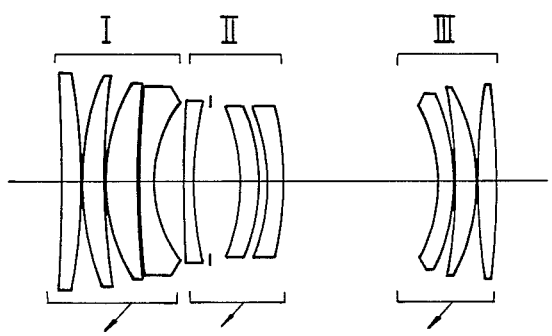
FIG. 4 represents a cross sectional view of the lens system according to a fourth embodiment of the present invention.
Figure 5:
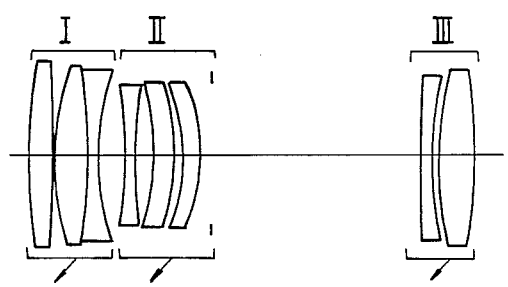
FIG. 5 represents a cross sectional view of the lens system according to a fifth embodiment of the present invention.
Figure 6:
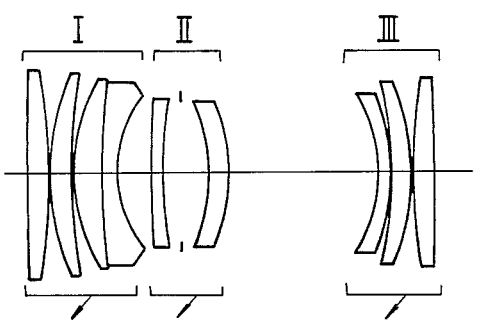
FIG. 6 represents a cross sectional view of the lens system according to a sixth embodiment of the present invention.
Figure 7:
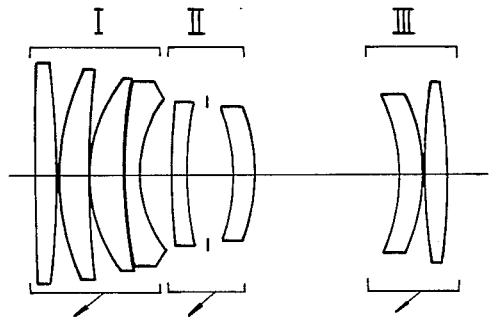
FIG. 7 represents a cross sectional view of the lens system according to a seventh embodiment of the present invention.
Figure 8:
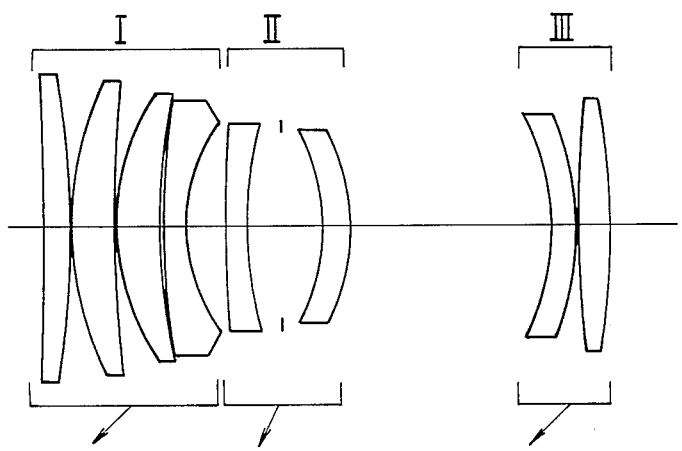
FIG. 8 represents a cross sectional view of the lens system according to a eighth embodiment of the present invention.
Figure 9:
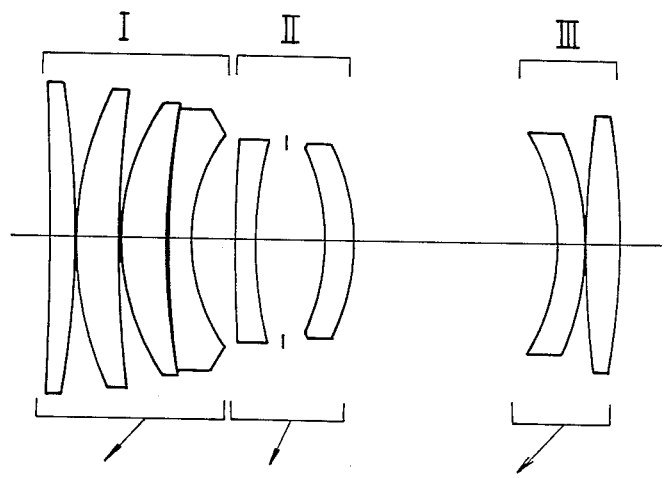
FIG. 9 represents a cross sectional view of the lens system according to a ninth embodiment of the present invention.
Figure 10:
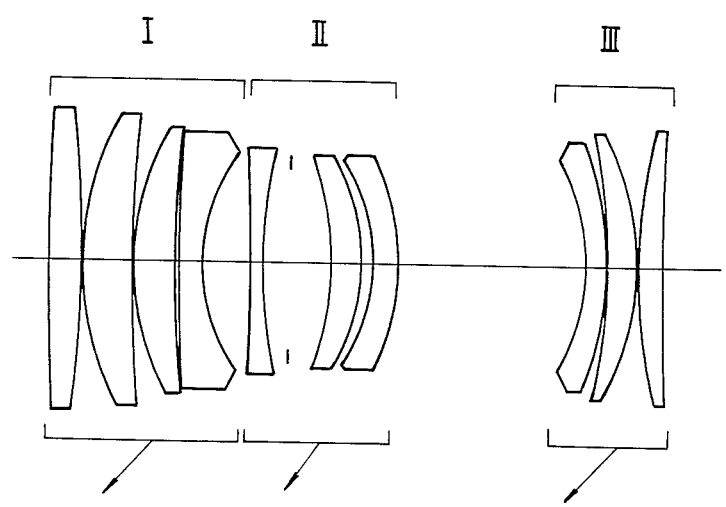
FIG. 10 represents a cross sectional view of the lens system according to a tenth embodiment of the present invention.
Figure 11A:
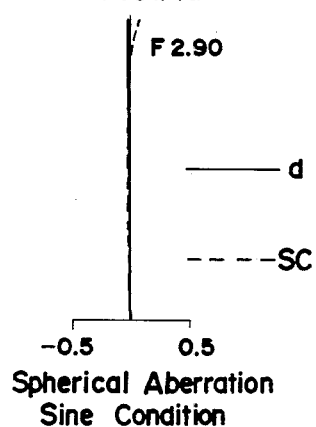
FIGS. 11a' to 11c represent the aberration curves of the first embodiment in infinity focusing condition.
Figure 11B:
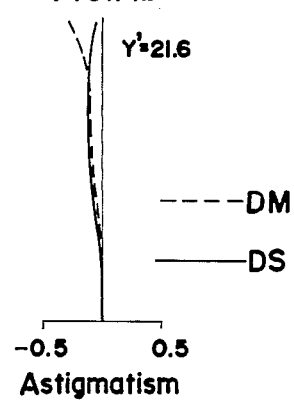
Figure 11C:
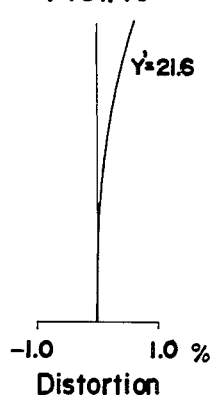
Figure 12A:
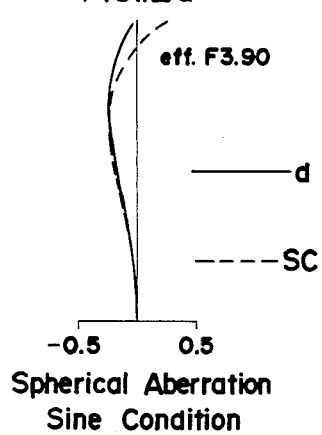
FIGS. 12a to 12c represent the aberration curves of the first embodiment in medium focusing condition of $\beta = -0.5$.
Figure 12B:
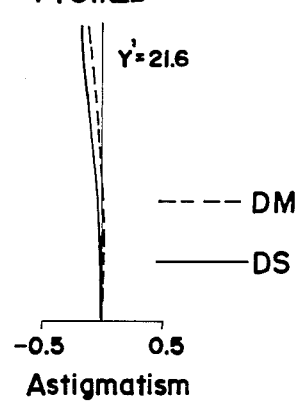
Figure 12C:
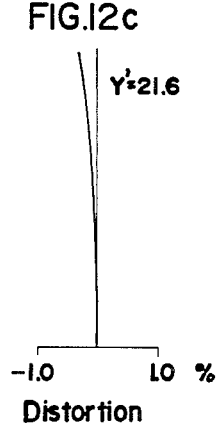
Figure 13A:
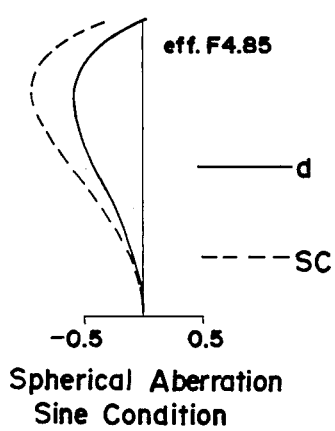
FIGS. 13a to 13c represent the aberration curves of the first embodiment in proximity focusing condition of $\beta = -1.0$.
Figure 13B:
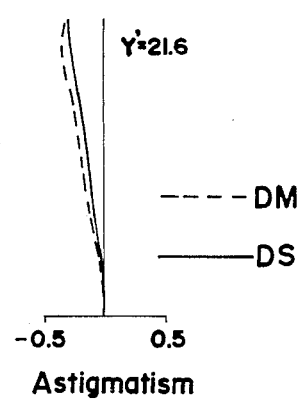
Figure 13C:
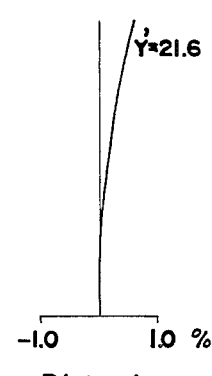
Figure 14A:
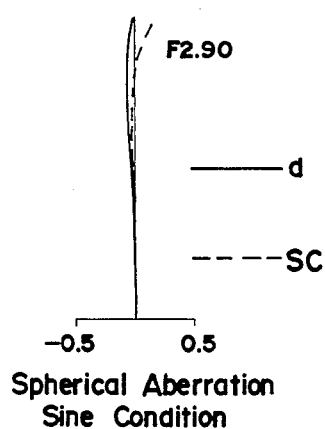
FIGS. 14a to 14c represent the aberration curves of the second embodiment in infinity focusing condition.
Figure 14B:
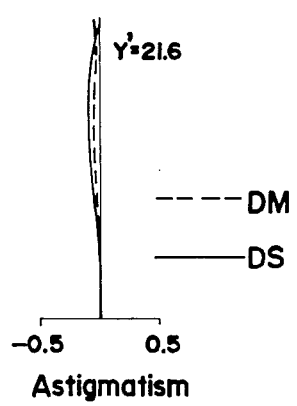
Figure 14C:
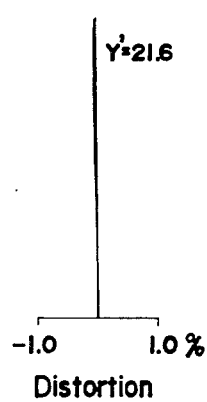
Figure 15A:
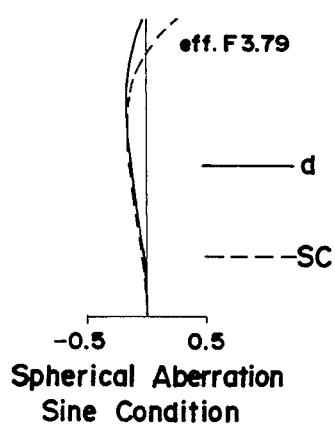
FIGS. 15a to 15c represent the aberration curves of the second embodiment in medium focusing condition of $\beta = -0.5$.
Figure 15B:
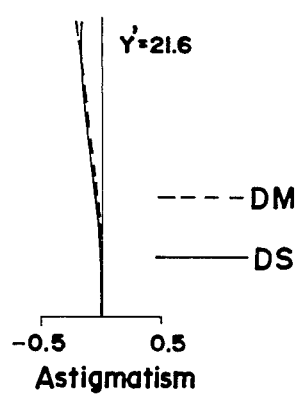
Figure 15C:
Figure 16A:
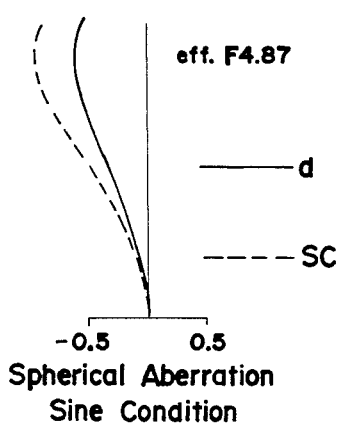
FIGS. 16a to 16c represent the aberration curves of the second embodiment in proximity focusing condition of $\beta = -1.0$.
Figure 16B:
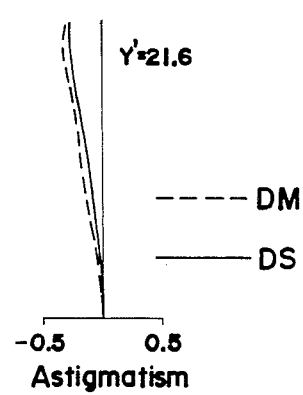
Figure 16C:
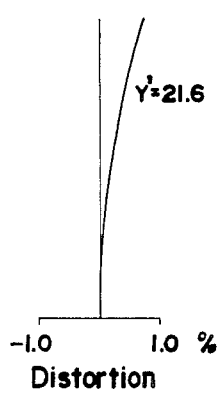
Figure 17A:
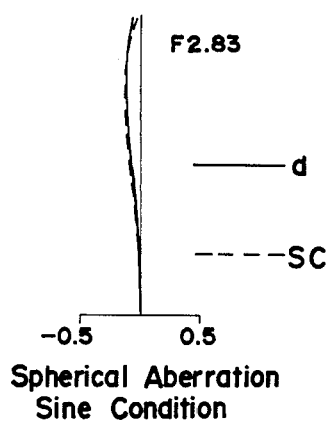
FIGS. 17a to 17c represent the aberration curves of the third embodiment in infinity focusing condition.
Figure 17B:
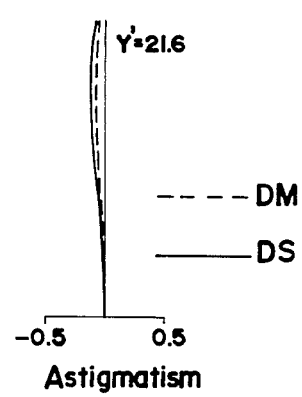
Figure 17C:
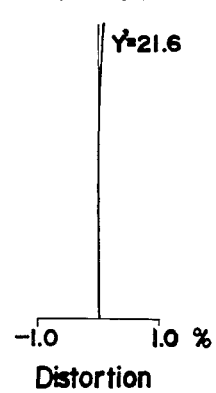
Figure 18A:
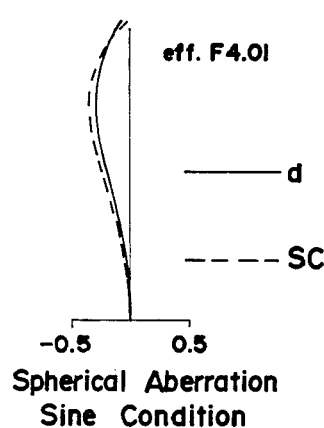
FIGS. 18a to 18c represent the aberration curves of the third embodiment in medium focusing condition of $\beta = -0.5$.
Figure 18B:
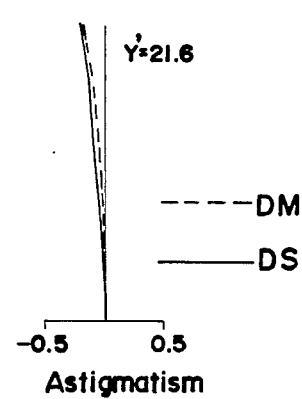
Figure 18C:
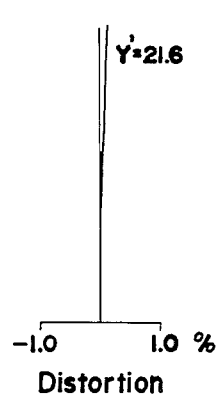
Figure 19A:
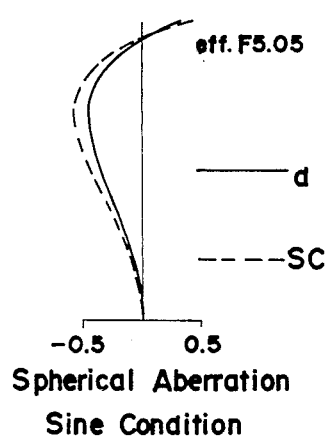
FIGS. 19a to 19c represent the aberration curves of the third embodiment in proximity focusing condition of $\beta = -1.0$.
Figure 19B:
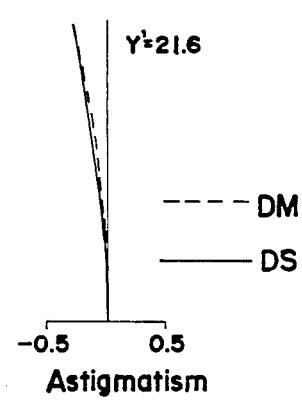
Figure 19C:
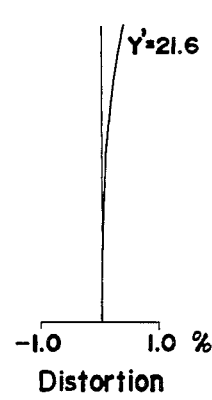
Figure 23A:
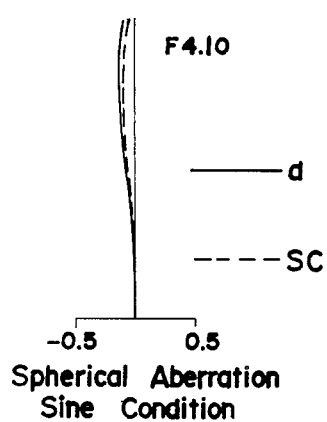
FIGS. 23a to 23c represent the aberration curves of the fifth embodiment in infinity focusing condition.
Figure 23B:
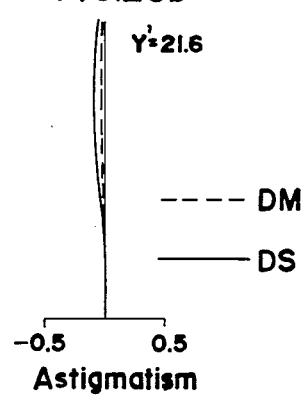
Figure 23C:
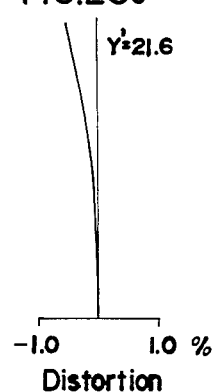
Figure 24A:
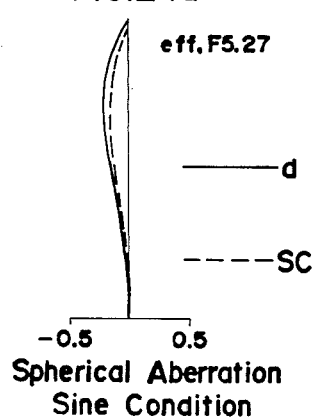
FIGS. 24a to 24c represent the aberration curves of the fifth embodiment in medium focusing condition of $\beta = -0.5$.
Figure 24B:
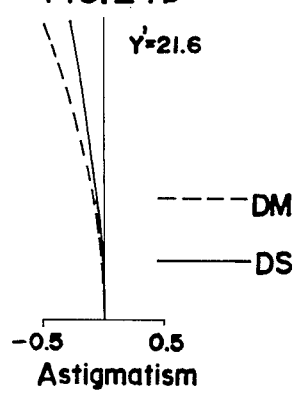
Figure 24C:
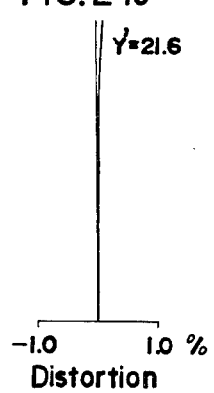
Figure 25A:
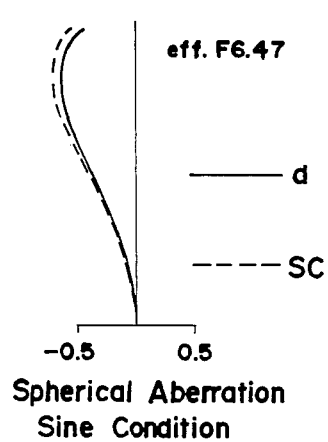
FIGS. 25a to 25c represent the aberration curves of the fifth embodiment in proximity focusing condition of $\beta = -1.0$.
Figure 25B:
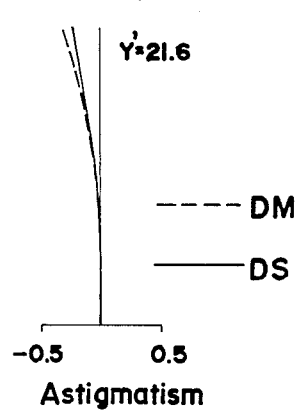
Figure 25C:
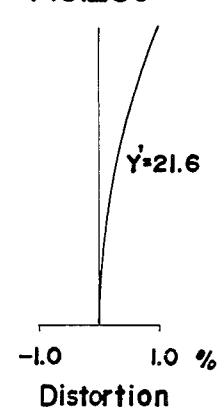
Figure 26A:
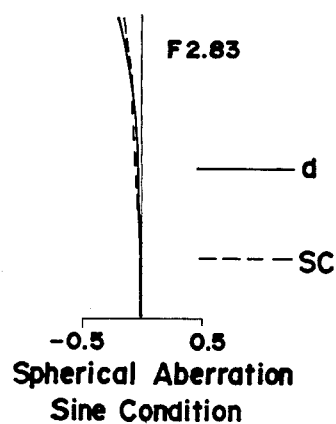
FIGS. 26a to 26c represent the aberration curves of the sixth embodiment in infinity focusing condition.
Figure 26B:
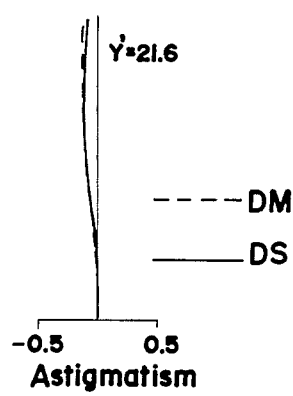
Figure 26C:
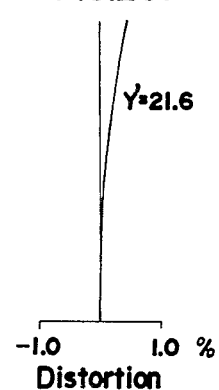
Figure 27A:
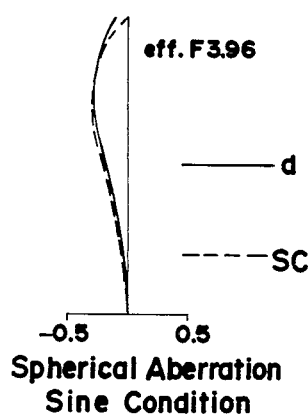
FIGS. 27a to 27c represent the aberration curves of the sixth embodiment in medium focusing condition of $\beta = -0.5$.
Figure 27B:
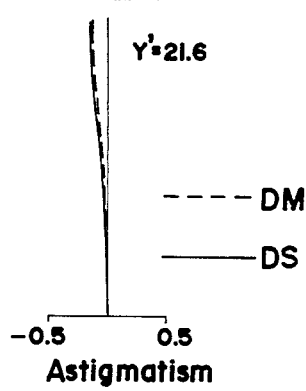
Figure 27C:
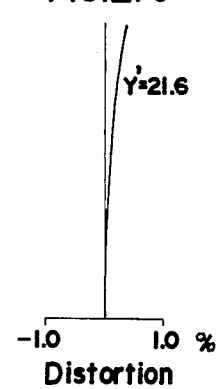
Figure 28A:
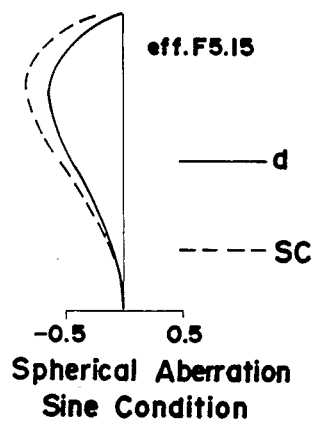
FIGS. 28a to 28c represent the aberration curves of the sixth embodiment in proximity focusing condition of $\beta = -1.0$.
Figure 28B:
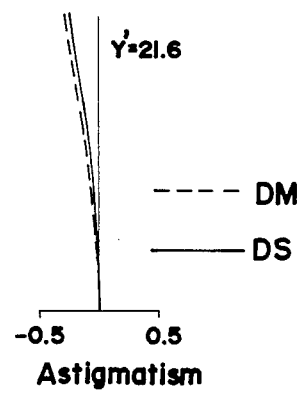
Figure 28C:
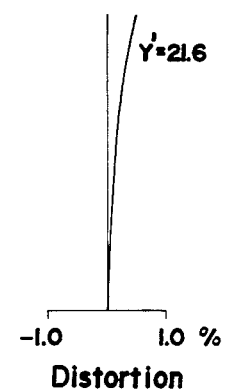
Figure 29A:
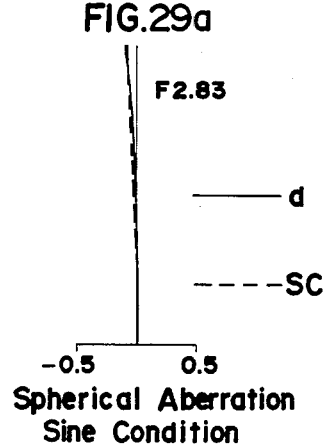
FIGS. 29a to 29c represent the aberration curves of the seventh embodiment in infinity focusing condition.
Figure 29B:
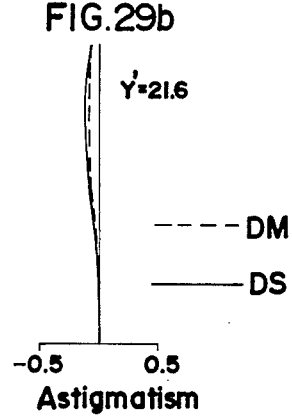
Figure 29C:
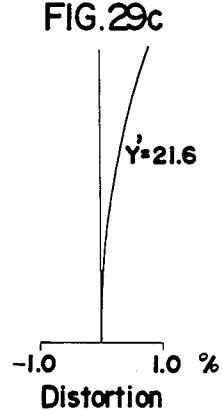
Figure 30A:
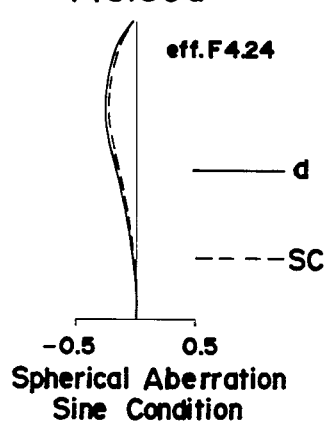
FIGS. 30a to 30c represent the aberration curves of the seventh embodiment in medium focusing condition of $\beta = -0.5$.
Figure 30B:
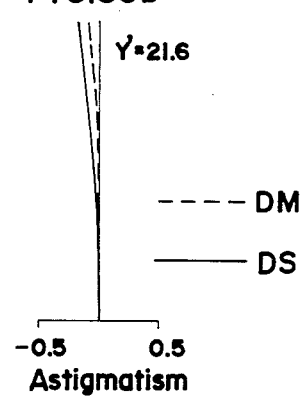
Figure 30C:
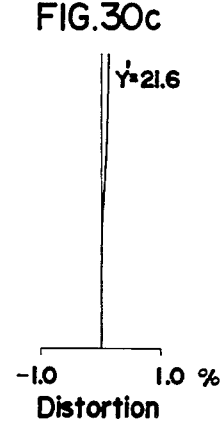
Figure 31A:
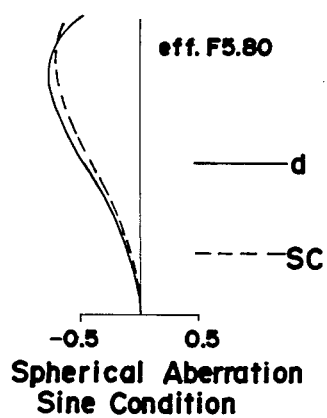
FIGS. 31a to 31c represent the aberration curves of the seventh embodiment in proximity focusing condition of $\beta = -1.0$.
Figure 31B:
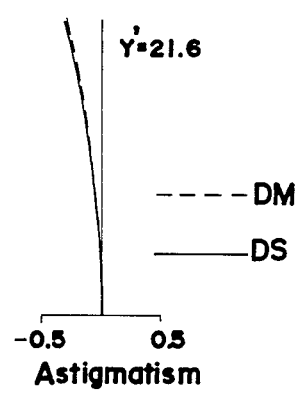
Figure 31C:
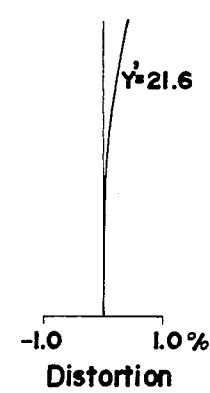
Figure 35A:
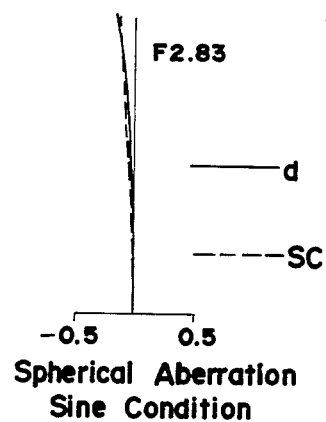
FIGS. 35a to 35c represent the aberration curves of the ninth embodiment in infinity focusing condition.
Figure 35B:
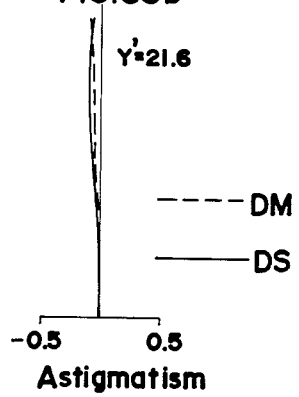
Figure 35C:
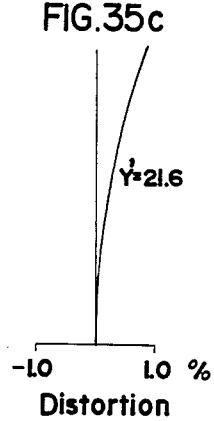
Figure 36A:
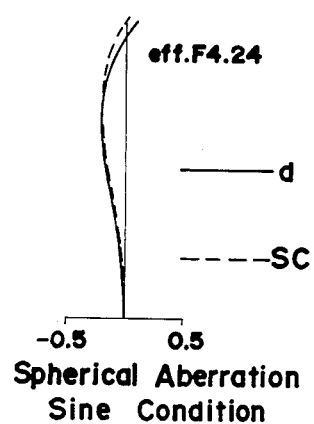
FIGS. 36a to 36c represent the aberration curves of the ninth embodiment in medium focusing condition of $\beta = -0.5$.
Figure 36B:
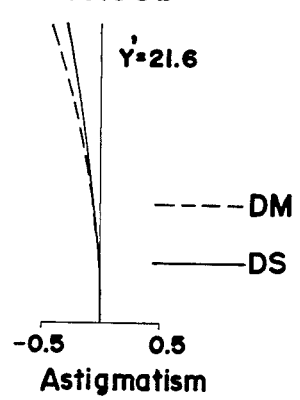
Figure 36C:
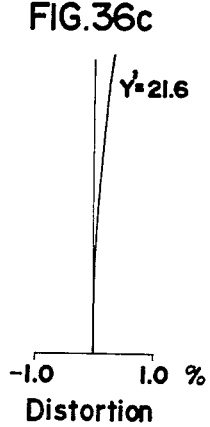
Figure 37A:
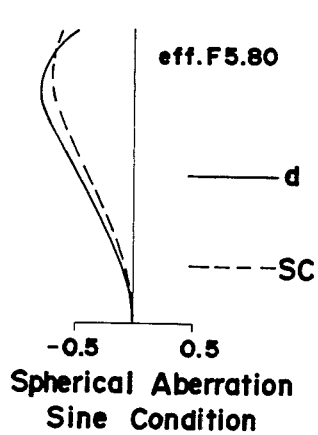
FIGS. 37a to 37c represent the aberration curves of the ninth embodiment in proximity focusing condition of $\beta = -1.0$.
Figure 37B:
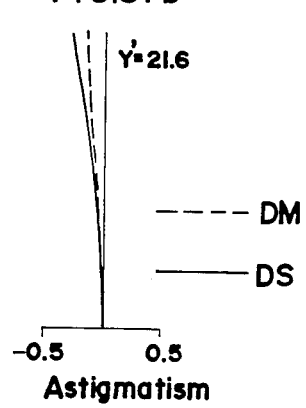
Figure 37C:
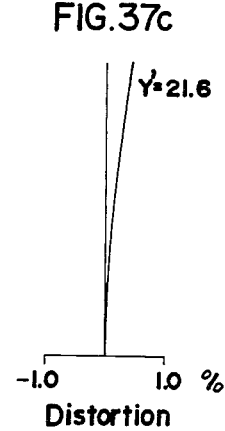
Figure 38A:
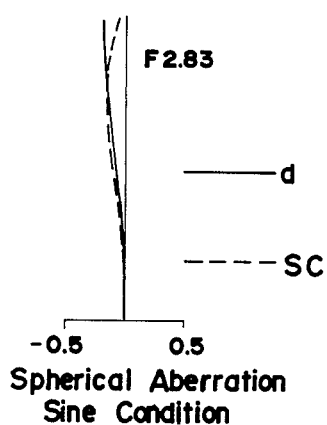
FIGS. 38a to 38c represent the aberration curves of the tenth embodiment in infinity focusing condition.
Figure 38B:
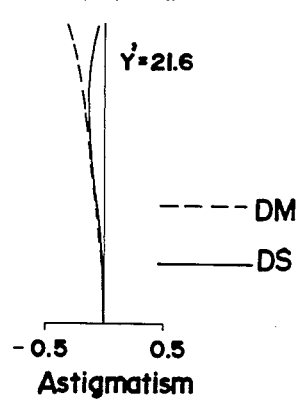
Figure 38C:
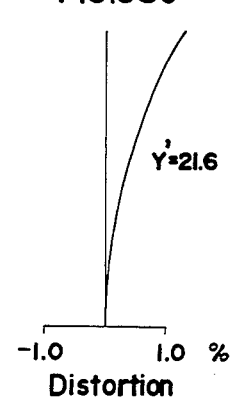
Figure 39A:
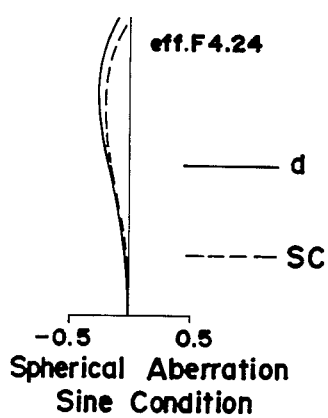
FIGS. 39a to 39c represent the aberration curves of the tenth embodiment in medium focusing condition of $\beta = -0.5$.
Figure 39B:
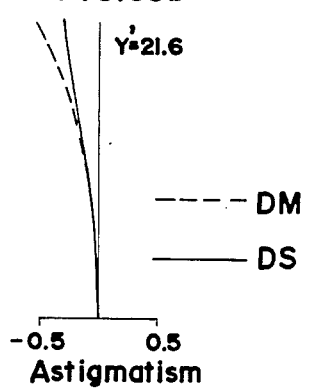
Figure 39C:
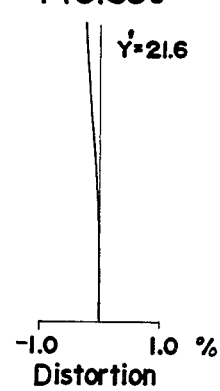
Figure 40A:
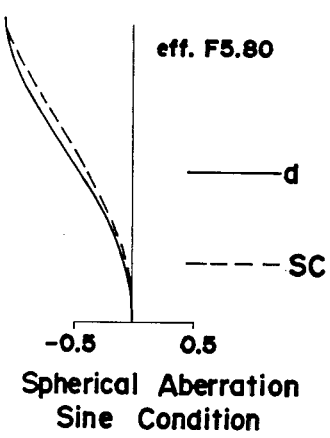
FIGS. 40a to 40c represent the aberration curves of the tenth embodiment in proximity focusing condtion of $\beta = -1.0$.
Figure 40B:
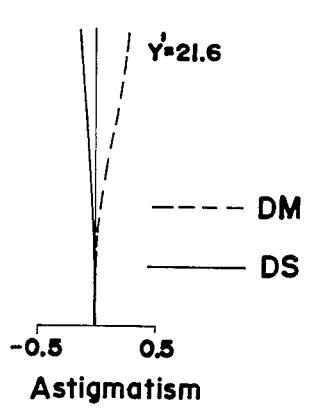
Figure 40C:
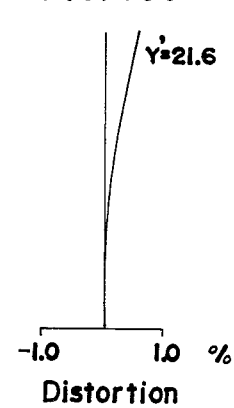

As shown in FIGS. 1 to 10, the present invention provides a telephoto lens system, comprising from the object side to the image side: a first lens group (I) of a positive refractive power; a second lens group (II) of a negative refractive power having a first air space formed between the first and second lens groups; and a third lens group (III) of a positive refractive power having a second air space formed between the second and third lens groups; wherein all of the first to third lens groups are shiftable along the optical axis in a focusing operation while enlarging the first air space decreasing the second air space when focusing is effected from infinity to a short distance; and wherein the lens system fulfills the following conditions:

$$1.1 < f/f_1 < 1.7 \qquad (1)$$

$$0.15f < D_{23} < 0.4f \qquad (2)$$

wherein: f represents a focal length of the whole lens system in an infinity focusing condition; $f_1$ represents a focal length of the first lens group (I); and $D_{23}$ represents an axial distance of the second air space formed between the second and third lens group in an infinity focusing condition.

Condition (1) limits the focal length of the first lens group (I). If the lower limit of condition (1) is violated with weakening of the refractive power of the first lens group (I), although the correction of aberrations becomes more easy, the compactness of the whole lens system is deteriorated because the lens shifting distance in the focusing operation is increased to the same extent as that of the whole lens groups shifting focusing system. On the other hand, if the upper limit of condition (1) is violated by increasing the refractive power of the first lens group (I), although the compactness of the whole lens system can be maintained easily, it is difficult to properly correct spherical aberration, astigmatism and coma aberration. Therefore, it becomes difficult to accomplish larger aperture lens system having a good correction of aberrations.

Condition (2) limits the axial distance of the second air space formed between the second lens group (II) and the third lens group (III) in an infinity focusing condition. If the lower limit of condition (2) is violated, it becomes easy to correct various aberration in an infinity focusing condition and to maintain a proper marginal light amount. However, the refractive power of the second lens group (II) and that of the third lens group (III) should be increased for effectively utilizing the change of second air space due to the focusing operation to decrease the lens shifting distance therein. Thus, it is difficult to correct spherical aberration and astigmatism with a good balance therebetween and to correct coma aberration properly in the photographic magnification of $\beta = -1.0$. This is undesirable for extending aperture. Here, unless the refractive powers of the second and third lens groups (II) (III) is increased, the lens shifting distance in the focusing operation is increased and it tends to be difficult to accomplish the object of the present invention. In the upper limit of condition (2) is violtated, the size of the whole lens system should be extended for maintaining a proper marginal light amount, and positive distortion is considerably increased.

The following conditions are effective for the present invention:

$$0.35 < f/f_{12} < 0.85 \quad (3)$$

$$1.2 < f_{23}/f < 5.0 \quad (4)$$

wherein: $f_{12}$ represents a compound focal length of the first and second lens groups in an infinity focusing condition; and $f_{23}$ represents a compound focal length of the second and third lens groups in an infinity focusing condition.

Conditions (3) and (4) limits the refractive power arrangement effective for maintaining the focal length of whole lens system in the focusing operation to substantially constant length and for decreasing the lens shifting distance in the focusing operation. If the lower limit of condition (3) or the upper limit of condition (4) is violated, it is difficult to correct the distortion and the coma aberration in a short distance focusing condition, though the refractive powers of the second and third lens groups can be decreased. On the oher hand, if the upper limit of condition (3) or the lower limit of condition (4) is violated, it becomes necessary to increase the refractive powers of each lens groups to keep the compactness of the lens system. Such violations will cause an increase in the change of the focal length of the lens system in the focusing operation, although the lens shifting distance in the focusing operation can be decreased. Furthermore, it is difficult to correct the coma aberration, and to correct the field curvature in the infinity focusing condition.

According to the present invention, the following conditions can be effective instead of the above conditions (1) to (4):

$$1.1 < f/f_1 < 1.8 \quad (5)$$

$$0.5 < f/|f_2| < 1.5 \quad (6)$$

wherein: $f_2$ represents the focal length of the second lens group (II).

Condition (5) limits the focal length of the first lens group (I) in the same manner as condition (1) does. If the lower limit of condition (5) is violated with a weakening of the refractive power of the first lens group (I), although the correction of aberrations becomes more easy, the compactness of the whole lens system is deteriorated because the lens shifting distance in the focusing operation is increased to the same extent as that of the whole lens groups shifting focusing system. On the other hand, if the upper limit of condition (5) is violated by increasing the refractive power of the first lens group (I), although the compactness of the whole lens system can be maintained easily, it is difficult to properly correct spherical aberration, astigmatism and coma aberration. Therefore, it becomes difficult to provide a larger aperture lens system having good correction of aberrations.

Condition (6) limits the focal length of the second lens group (II). If the lower limit of condition (6) is violated, the compactness of the whole lens system is deteriorated in keeping a proper marginal light amount since the refractive power of the second lens group (II) is considerably weak. Additionally, since the refractive power of the first lens group (I) or the third lens group (III) should be increased for shortening the lens shifting distance in the focusing operation, it becomes difficult to correct the field curvature and the astigmatism. If the upper limit of condition (5) is violated, although the lens shifting distance in the focusing operation can be shortened, it becomes difficult to correct the distortion and the coma aberration. The reason is that the refractive power arrangement of the lens system in a short distance side becomes similar to that of a telephoto type lens system including a positive front lens group and negative rear lens group.

Additionally, the following condition is effective in combination with the above conditions (5) and (6):

$$0.95 < \Delta A/\Delta B < 2.5 \quad (7)$$

wherein: $\Delta A$ represents a lens shifting distance of the first lens group (I) in a focusing operation from an infinity focusing condition to a proximity focusing condition; and $\Delta B$ represents a lens shifting distance of the second lens group (II) in the focusing operation.

Condition (7) is effective for keeping a proper perspective for telephoto macrolens, and to extend the distance to an object to be focused with respect to an aperture diaphragm normally located in the second lens group (II). If the lower limit of condition (7) is violated, the proper perspective for a telephoto macrolens can not be obtained since it becomes that of a short focal length lens, and the lens shifting distance in the focusing operation becomes considerably large. If the upper limit of condition (7) is violated, although the lens shifting distance in the focusing operation can be decreased, the compactness of the whole lens system is deteriorated for keeping a proper marginal light amount in an infinity focusing condition, or it becomes difficult to properly correct the spherical aberration, the coma aberration and the distortion since the refractive powers of each lens groups is increased. The latter is undesirable for obtaining larger aperture lens systems.

In the present invention, the possibility of design choice can be increased and the correction of aberrations can become more easily accomplished by locating at least a lens group at the image side of the third lens group (III). The lens group located at the image side of the third lens group (III) is effective for shifting the focal length of the whole lens system, if fixed in the focusing operation. Additionally, if the lens group having a focal length greater than 5 times that of the whole lens system is located at the image side of the third lens group (III) and is shifted in the focusing operation, the aberrations would be corrected more easily.

Furthermore, it may be desired that the second lens group (II) includes at least a positive meniscus lens convex to the image side, and that the third lens group (III) includes at least a negative meniscus lens convex to the image side, in order to achieve the object of the present invention.

The following Tables 1 to 10 disclose, respectively, the first through tenth embodiments of the present invention. In the Tables, f equals the focal length, r is the radius of curvature with respective sub numbers indicating the surfaces from the object to image side along the optical axis, d represents the axial distance and includes both the air spaces and the actual thickness of the lenses along the optical axis, N equals the refractive index and again, the sub numbers refer to the particular optical element from the object to image side, and finally, $\nu$ equals the Abbe number and the sub numbers refer to the specific lens elements from the object to image side.

In the tables, object distance represents the distance from the lens system to the focussed object.

TABLE 1

[Embodiment 1]

| f = 100 | | $F_{No.}$ = 2.90 | | |
|---|---|---|---|---|
| radius of curvature | axial distance | refractive index (Nd) | | Abbe number |
| $r_1$ 260.150 | | | | |
| | $d_1$ 3.70 | $N_1$ | 1.51680 | $\nu_1$ 64.12 |
| $r_2$ −133.407 | | | | |
| | $d_2$ 0.15 | | | |
| $r_3$ 35.892 | | | | |
| | $d_3$ 4.30 | $N_2$ | 1.69350 | $\nu_2$ 51.83 |
| $r_4$ 153.530 | | | | |
| | $d_4$ 0.15 | | | |
| $r_5$ 26.981 | | | | |
| | $d_5$ 4.70 | $N_3$ | 1.72000 | $\nu_3$ 50.31 |
| $r_6$ 115.553 | | | | |
| | $d_6$ 0.35 | | | |
| $r_7$ 141.603 | | | | |
| | $d_7$ 2.50 | $N_4$ | 1.80741 | $\nu_4$ 31.59 |
| $r_8$ 19.816 | | | | |
| | $d_8$ 6.00 | | | |
| $r_9$ −156.251 | | | | |
| | $d_9$ 1.50 | $N_5$ | 1.77250 | $\nu_5$ 49.77 |
| $r_{10}$ 63.457 | | | | |
| | $d_{10}$ 8.00 | | | |
| $r_{11}$ −32.371 | | | | |
| | $d_{11}$ 3.50 | $N_6$ | 1.67339 | $\nu_6$ 29.25 |
| $r_{12}$ −24.084 | | | | |

TABLE 1-continued

[Embodiment 1]

| | | | | |
|---|---|---|---|---|
| | $d_{12}$ 1.42 | | | |
| $r_{13}$ −21.908 | | | | |
| | $d_{13}$ 3.00 | $N_7$ | 1.77250 | $\nu_7$ 49.77 |
| $r_{14}$ −25.980 | | | | |
| | $d_{14}$ 22.00 | | | |
| $r_{15}$ −24.946 | | | | |
| | $d_{15}$ 2.50 | $N_8$ | 1.80741 | $\nu_8$ 31.59 |
| $r_{16}$ −38.122 | | | | |
| | $d_{16}$ 0.15 | | | |
| $r_{17}$ −84.095 | | | | |
| | $d_{17}$ 3.50 | $N_9$ | 1.51680 | $\nu_9$ 64.12 |
| $r_{18}$ −31.289 | | | | |
| | $d_{18}$ 0.15 | | | |
| $r_{19}$ 74.840 | | | | |
| | $d_{19}$ 3.00 | $N_{10}$ | 1.51680 | $\nu_{10}$ 64.12 |
| $r_{20}$ −21276.576 | | | | |

| magnification | focal length | object distance | $d_8$ | $d_{14}$ |
|---|---|---|---|---|
| −0.5 | 104.6 | −260.3 | 15.34 | 27.10 |
| −1.0 | 94.3 | −159.1 | 20.13 | 0.90 |
| $f/f_1 = 1.55$, | $D_{23} = d_{14} = 0.22\,f$, | $f/f_{12} = 0.673$, | $f_{23}/f = 2.52$ | |

TABLE 2

[Embodiment 2]

| f = 100 | | $F_{No.}$ = 2.90 | | |
|---|---|---|---|---|
| radius of curvature | axial distance | refractive index (Nd) | | Abbe number |
| $r_1$ 100.551 | | | | |
| | $d_1$ 4.50 | $N_1$ | 1.69680 | $\nu_1$ 56.47 |
| $r_2$ −207.885 | | | | |
| | $d_2$ 0.15 | | | |
| $r_3$ 36.188 | | | | |
| | $d_3$ 4.00 | $N_2$ | 1.80500 | $\nu_2$ 40.97 |
| $r_4$ 81.990 | | | | |
| | $d_4$ 0.15 | | | |
| $r_5$ 37.621 | | | | |
| | $d_5$ 4.75 | $N_3$ | 1.83400 | $\nu_3$ 37.05 |
| $r_6$ 61.566 | | | | |
| | $d_6$ 0.55 | | | |
| $r_7$ 87.773 | | | | |
| | $d_7$ 1.50 | $N_4$ | 1.84666 | $\nu_4$ 23.83 |
| $r_8$ 24.519 | | | | |
| | $d_8$ 5.00 | | | |
| $r_9$ −188.223 | | | | |
| | $d_9$ 1.30 | $N_5$ | 1.77250 | $\nu_5$ 49.77 |
| $r_{10}$ 71.858 | | | | |
| | $d_{10}$ 9.46 | | | |
| $r_{11}$ −25.500 | | | | |
| | $d_{11}$ 2.50 | $N_6$ | 1.83400 | $\nu_6$ 37.05 |
| $r_{12}$ −20.792 | | | | |
| | $d_{12}$ 0.58 | | | |
| $r_{13}$ −19.993 | | | | |
| | $d_{13}$ 2.00 | $N_7$ | 1.69680 | $\nu_7$ 56.47 |
| $r_{14}$ −25.472 | | | | |
| | $d_{14}$ 30.00 | | | |
| $r_{15}$ −27.371 | | | | |
| | $d_{15}$ 1.50 | $N_8$ | 1.80741 | $\nu_8$ 31.59 |
| $r_{16}$ −41.178 | | | | |
| | $d_{16}$ 0.15 | | | |
| $r_{17}$ −85.031 | | | | |
| | $d_{17}$ 3.50 | $N_9$ | 1.58913 | $\nu_9$ 61.11 |
| $r_{18}$ −34.441 | | | | |
| | $d_{18}$ 0.15 | | | |
| $r_{19}$ 107.023 | | | | |
| | $d_{19}$ 3.00 | $N_{10}$ | 1.58913 | $\nu_{10}$ 61.11 |
| $r_{20}$ −194.103 | | | | |

| magnification | focal length | object distance | $d_8$ | $d_{14}$ |
|---|---|---|---|---|
| −0.5 | 112.3 | −253.9 | 16.45 | 30.00 |
| −1.0 | 98.3 | −159.0 | 33.39 | 1.61 |
| $f/f_1 = 1.40$, | $D_{23} = d_{14} = 0.30\,f$, | $f/f_{12} = 0.495$, | $f_{23}/f = 1.46$ | |

TABLE 3

[Embodiment 3]

| f = 100 | $F_{No.}$ = 2.83 |
|---|---|

TABLE 3-continued

[Embodiment 3]

| radius of curvature | | axial distance | | refractive index (Nd) | | Abbe number |
|---|---|---|---|---|---|---|
| $r_1$ | 379.799 | | | | | |
| | | $d_1$ | 3.50 | $N_1$ | 1.51680 $\nu_1$ | 64.12 |
| $r_2$ | −123.986 | | | | | |
| | | $d_2$ | 0.15 | | | |
| $r_3$ | 41.583 | | | | | |
| | | $d_3$ | 3.60 | $N_2$ | 1.77250 $\nu_2$ | 49.77 |
| $r_4$ | 85.521 | | | | | |
| | | $d_4$ | 0.15 | | | |
| $r_5$ | 29.413 | | | | | |
| | | $d_5$ | 5.20 | $N_3$ | 1.77250 $\nu_3$ | 49.77 |
| $r_6$ | 125.483 | | | | | |
| | | $d_6$ | 0.08 | | | |
| $r_7$ | 136.533 | | | | | |
| | | $d_7$ | 2.50 | $N_4$ | 1.74000 $\nu_4$ | 31.72 |
| $r_8$ | 21.452 | | | | | |
| | | $d_8$ | 5.50 | | | |
| $r_9$ | 11645.500 | | | | | |
| | | $d_9$ | 1.80 | $N_5$ | 1.69680 $\nu_5$ | 56.47 |
| $r_{10}$ | 63.593 | | | | | |
| | | $d_{10}$ | 8.82 | | | |
| $r_{11}$ | −27.472 | | | | | |
| | | $d_{11}$ | 3.50 | $N_6$ | 1.83400 $\nu_6$ | 37.05 |
| $r_{12}$ | −25.831 | | | | | |
| | | $d_{12}$ | 1.40 | | | |
| $r_{13}$ | −23.518 | | | | | |
| | | $d_{13}$ | 3.00 | $N_7$ | 1.51680 $\nu_7$ | 64.12 |
| $r_{14}$ | −27.204 | | | | | |
| | | $d_{14}$ | 24.00 | | | |
| $r_{15}$ | −26.475 | | | | | |
| | | $d_{15}$ | 2.50 | $N_8$ | 1.80741 $\nu_8$ | 31.59 |
| $r_{16}$ | −37.847 | | | | | |
| | | $d_{16}$ | 0.15 | | | |
| $r_{17}$ | −67.037 | | | | | |
| | | $d_{17}$ | 3.60 | $N_9$ | 1.51680 $\nu_9$ | 64.12 |
| $r_{18}$ | −32.488 | | | | | |
| | | $d_{18}$ | 0.15 | | | |
| $r_{19}$ | 92.616 | | | | | |
| | | $d_{19}$ | 3.30 | $N_{10}$ | 1.51680 $\nu_{10}$ | 64.12 |
| $r_{20}$ | −353.822 | | | | | |

| magnification | focal length | object distance | $d_8$ | $d_{14}$ |
|---|---|---|---|---|
| −0.5 | 108.3 | −265.2 | 20.98 | 20.13 |
| −1.0 | 98.1 | −160.1 | 28.41 | 1.09 |

$f/f_1 = 1.32$, $D_{23} = d_{14} = 0.24\,f$, $f/f_{12} = 0.638$, $f_{23}/f = 1.99$

TABLE 4

[Embodiment 4]

$f = 100$   $F_{No.} = 2.83$

| radius of curvature | | axial distance | | refractive index (Nd) | | Abbe number |
|---|---|---|---|---|---|---|
| $r_1$ | −513.595 | | | | | |
| | | $d_1$ | 3.30 | $N_1$ | 1.51680 $\nu_1$ | 64.12 |
| $r_2$ | −111.804 | | | | | |
| | | $d_2$ | 0.15 | | | |
| $r_3$ | 43.817 | | | | | |
| | | $d_3$ | 3.80 | $N_2$ | 1.77250 $\nu_2$ | 49.77 |
| $r_4$ | 115.100 | | | | | |
| | | $d_4$ | 0.15 | | | |
| $r_5$ | 29.711 | | | | | |
| | | $d_5$ | 5.40 | $N_3$ | 1.77250 $\nu_3$ | 49.77 |
| $r_6$ | 139.240 | | | | | |
| | | $d_6$ | 0.35 | | | |
| $r_7$ | 167.034 | | | | | |
| | | $d_7$ | 2.50 | $N_4$ | 1.74000 $\nu_4$ | 31.72 |
| $r_8$ | 21.624 | | | | | |
| | | $d_8$ | 5.00 | | | |
| $r_9$ | 441.998 | | | | | |
| | | $d_9$ | 1.80 | $N_5$ | 1.69680 $\nu_5$ | 56.47 |
| $r_{10}$ | 59.565 | | | | | |
| | | $d_{10}$ | 7.50 | | | |
| $r_{11}$ | −33.399 | | | | | |
| | | $d_{11}$ | 3.50 | $N_6$ | 1.83400 $\nu_6$ | 37.05 |
| $r_{12}$ | −29.518 | | | | | |
| | | $d_{12}$ | 1.20 | | | |
| $r_{13}$ | −33.154 | | | | | |
| | | $d_{13}$ | 3.00 | $N_7$ | 1.51680 $\nu_7$ | 64.12 |
| $r_{14}$ | −50.144 | | | | | |
| | | $d_{14}$ | 26.00 | | | |
| $r_{15}$ | −22.524 | | | | | |
| | | $d_{15}$ | 2.50 | $N_8$ | 1.80741 $\nu_8$ | 31.59 |
| $r_{16}$ | −32.459 | | | | | |
| | | $d_{16}$ | 0.15 | | | |
| $r_{17}$ | −70.342 | | | | | |
| | | $d_{17}$ | 3.70 | $N_9$ | 1.51680 $\nu_9$ | 64.12 |
| $r_{18}$ | −28.879 | | | | | |
| | | $d_{18}$ | 0.15 | | | |
| $r_{19}$ | 132.768 | | | | | |
| | | $d_{19}$ | 3.20 | $N_{10}$ | 1.51680 $\nu_{10}$ | 64.12 |
| $r_{20}$ | −123.724 | | | | | |

| magnification | focal length | object distance | $d_8$ | $d_{14}$ |
|---|---|---|---|---|
| −0.5 | 110.2 | −258.8 | 22.11 | 18.39 |
| −1.0 | 100.8 | −158.1 | 28.32 | 2.68 |

$f/f_1 = 1.25$, $D_{23} = d_{14} = 0.26\,f$, $f/f_{12} = 0.482$, $f_{23}/f = 1.42$

TABLE 5

[Embodiment 5]

$f = 100$   $F_{No.} = 4.10$

| radius of curvature | | axial distance | | refractive index (Nd) | | Abbe number |
|---|---|---|---|---|---|---|
| $r_1$ | 83.181 | | | | | |
| | | $d_1$ | 3.50 | $N_1$ | 1.77250 $\nu_1$ | 49.77 |
| $r_2$ | −159.218 | | | | | |
| | | $d_2$ | 0.15 | | | |
| $r_3$ | 46.174 | | | | | |
| | | $d_3$ | 4.50 | $N_2$ | 1.77250 $\nu_2$ | 49.77 |
| $r_4$ | −129.099 | | | | | |
| | | $d_4$ | 0.22 | | | |
| $r_5$ | −101.893 | | | | | |
| | | $d_5$ | 1.50 | $N_3$ | 1.74000 $\nu_3$ | 31.72 |
| $r_6$ | 41.921 | | | | | |
| | | $d_6$ | 4.00 | | | |
| $r_7$ | −47.744 | | | | | |
| | | $d_7$ | 1.30 | $N_4$ | 1.51680 $\nu_4$ | 64.12 |
| $r_8$ | 79.050 | | | | | |
| | | $d_8$ | 2.65 | | | |
| $r_9$ | −35.116 | | | | | |
| | | $d_9$ | 3.00 | $N_5$ | 1.83400 $\nu_5$ | 37.05 |
| $r_{10}$ | −27.307 | | | | | |
| | | $d_{10}$ | 1.00 | | | |
| $r_{11}$ | −28.090 | | | | | |
| | | $d_{11}$ | 2.00 | $N_6$ | 1.51472 $\nu_6$ | 52.15 |
| $r_{12}$ | −32.958 | | | | | |
| | | $d_{12}$ | 32.00 | | | |
| $r_{13}$ | 1108.081 | | | | | |
| | | $d_{13}$ | 1.40 | $N_7$ | 1.74000 $\nu_7$ | 31.72 |
| $r_{14}$ | 49.051 | | | | | |
| | | $d_{14}$ | 1.10 | | | |
| $r_{15}$ | 52.227 | | | | | |
| | | $d_{15}$ | 5.50 | $N_8$ | 1.77250 $\nu_8$ | 49.77 |
| $r_{16}$ | −100.787 | | | | | |

| magnification | focal length | object distance | $d_8$ | $d_{14}$ |
|---|---|---|---|---|
| −0.5 | 102.8 | −262.6 | 12.44 | 29.16 |
| −1.0 | 92.1 | −166.2 | 30.46 | 3.54 |

$f/f_1 = 1.40$, $D_{23} = d_{12} = 0.32\,f$, $f/f_{12} = 0.429$, $f_{23}/f = 3.85$

TABLE 6

[Embodiment 6]

$f = 100$   $F_{No.} = 2.83$

| radius of curvature | | axial distance | | refractive index (Nd) | | Abbe number |
|---|---|---|---|---|---|---|
| $r_1$ | 1678.865 | | | | | |
| | | $d_1$ | 3.50 | $N_1$ | 1.61800 $\nu_1$ | 63.45 |
| $r_2$ | −133.505 | | | | | |
| | | $d_2$ | 0.15 | | | |
| $r_3$ | 41.012 | | | | | |
| | | $d_3$ | 3.60 | $N_2$ | 1.77250 $\nu_2$ | 49.77 |
| $r_4$ | 88.521 | | | | | |

TABLE 6-continued

[Embodiment 6]

| | radius of curvature | axial distance | refractive index (Nd) | Abbe number |
|---|---|---|---|---|
| $r_5$ | 29.608 | | | |
| | | $d_5$ 5.20 | $N_3$ 1.77250 | $\nu_3$ 49.77 |
| $r_6$ | 125.483 | | | |
| | | $d_6$ 0.11 | | |
| $r_7$ | 140.816 | | | |
| | | $d_7$ 2.50 | $N_4$ 1.74000 | $\nu_4$ 31.72 |
| $r_8$ | 21.666 | | | |
| | | $d_8$ 5.50 | | |
| $r_9$ | 7721.406 | | | |
| | | $d_9$ 1.80 | $N_5$ 1.69680 | $\nu_5$ 56.47 |
| $r_{10}$ | 67.239 | | | |
| | | $d_{10}$ 7.80 | | |
| $r_{11}$ | −27.191 | | | |
| | | $d_{11}$ 3.50 | $N_6$ 1.83400 | $\nu_6$ 37.05 |
| $r_{12}$ | −27.737 | | | |
| | | $d_{12}$ 24.00 | | |
| $r_{13}$ | −26.855 | | | |
| | | $d_{13}$ 2.50 | $N_7$ 1.80741 | $\nu_7$ 31.59 |
| $r_{14}$ | −35.426 | | | |
| | | $d_{14}$ 0.15 | | |
| $r_{15}$ | −54.306 | | | |
| | | $d_{15}$ 3.20 | $N_8$ 1.61800 | $\nu_8$ 63.45 |
| $r_{16}$ | −36.698 | | | |
| | | $d_{16}$ 0.15 | | |
| $r_{17}$ | 115.510 | | | |
| | | $d_{17}$ 3.60 | $N_9$ 1.61800 | $\nu_9$ 63.45 |
| $r_{18}$ | −266.613 | | | |

| magnification | focal length | object distance | $d_8$ | $d_{14}$ |
|---|---|---|---|---|
| −0.5 | 101.4 | −266.6 | 18.54 | 16.55 |
| −1.0 | 94.5 | −167.4 | 27.94 | 1.56 |

$f/f_1 = 1.32$, $D_{23} = d_{12} = 0.24\ f$, $f/f_{12} = 0.657$, $f_{23}/f = 2.73$

TABLE 7

[Embodiment 7]

$f = 100$ $F_{No.} = 2.83$

| | radius of curvature | axial distance | refractive index (Nd) | Abbe number |
|---|---|---|---|---|
| $r_1$ | −1117.280 | | | |
| | | $d_1$ 3.20 | $N_1$ 1.51680 | $\nu_1$ 64.20 |
| $r_2$ | −123.050 | | | |
| | | $d_2$ 0.15 | | |
| $r_3$ | 39.070 | | | |
| | | $d_3$ 5.00 | $N_2$ 1.69100 | $\nu_2$ 54.75 |
| $r_4$ | 142.066 | | | |
| | | $d_4$ 0.15 | | |
| $r_5$ | 26.741 | | | |
| | | $d_5$ 5.50 | $N_3$ 1.69100 | $\nu_3$ 54.75 |
| $r_6$ | 74.864 | | | |
| | | $d_6$ 0.32 | | |
| $r_7$ | 93.234 | | | |
| | | $d_7$ 2.50 | $N_4$ 1.74000 | $\nu_4$ 31.72 |
| $r_8$ | 20.311 | | | |
| | | $d_8$ 5.40 | | |
| $r_9$ | 175.874 | | | |
| | | $d_9$ 2.50 | $N_5$ 1.69680 | $\nu_5$ 56.47 |
| $r_{10}$ | 52.297 | | | |
| | | $d_{10}$ 7.90 | | |
| $r_{11}$ | −26.024 | | | |
| | | $d_{11}$ 3.50 | $N_6$ 1.83400 | $\nu_6$ 37.05 |
| $r_{12}$ | −26.633 | | | |
| | | $d_{12}$ 24.00 | | |
| $r_{13}$ | −25.989 | | | |
| | | $d_{13}$ 3.50 | $N_7$ 1.80741 | $\nu_7$ 31.59 |
| $r_{14}$ | −31.510 | | | |
| | | $d_{14}$ 0.15 | | |
| $r_{15}$ | 105.131 | | | |
| | | $d_{15}$ 4.00 | $N_8$ 1.51680 | $\nu_8$ 64.20 |
| $r_{16}$ | −90.768 | | | |

| magnification | focal length | object distance | $d_8$ | $d_{14}$ |
|---|---|---|---|---|
| −0.5 | 98.7 | −269.8 | 17.98 | 14.38 |
| −1.0 | 92.9 | −171.4 | 28.32 | 1.08 |

$f/f_1 = 1.32$, $D_{23} = d_{12} = 0.24\ f$, $f/f_{12} = 0.757$, $f_{23}/f = 3.42$

TABLE 8

[Embodiment 8]

$f = 100$ $F_{No.} = 2.83$

| | radius of curvature | axial distance | refractive index (Nd) | Abbe number |
|---|---|---|---|---|
| $r_1$ | −526.906 | | | |
| | | $d_1$ 3.20 | $N_1$ 1.51823 | $\nu_1$ 58.96 |
| $r_2$ | −112.249 | | | |
| | | $d_2$ 0.15 | | |
| $r_3$ | 38.629 | | | |
| | | $d_3$ 5.00 | $N_2$ 1.69100 | $\nu_2$ 54.75 |
| $r_4$ | 144.829 | | | |
| | | $d_4$ 0.15 | | |
| $r_5$ | 26.209 | | | |
| | | $d_5$ 5.50 | $N_3$ 1.69100 | $\nu_3$ 54.75 |
| $r_6$ | 74.864 | | | |
| | | $d_6$ 0.33 | | |
| $r_7$ | 93.593 | | | |
| | | $d_7$ 2.50 | $N_4$ 1.74000 | $\nu_4$ 31.72 |
| $r_8$ | 19.714 | | | |
| | | $d_8$ 5.00 | | |
| $r_9$ | 212.931 | | | |
| | | $d_9$ 2.50 | $N_5$ 1.69680 | $\nu_5$ 56.47 |
| $r_{10}$ | 51.495 | | | |
| | | $d_{10}$ 8.70 | | |
| $r_{11}$ | −25.443 | | | |
| | | $d_{11}$ 3.38 | $N_6$ 1.83400 | $\nu_6$ 37.05 |
| $r_{12}$ | −26.167 | | | |
| | | $d_{12}$ 24.00 | | |
| $r_{13}$ | −27.741 | | | |
| | | $d_{13}$ 2.80 | $N_7$ 1.80741 | $\nu_7$ 31.59 |
| $r_{14}$ | −33.723 | | | |
| | | $d_{14}$ 0.15 | | |
| $r_{15}$ | 133.487 | | | |
| | | $d_{15}$ 4.00 | $N_8$ 1.58913 | $\nu_8$ 61.11 |
| $r_{16}$ | −80.018 | | | |

| magnification | focal length | object distance | $d_8$ | $d_{12}$ |
|---|---|---|---|---|
| −0.5 | 96.9 | −266.4 | 18.36 | 10.64 |
| −1.0 | 93.2 | −171.0 | 27.50 | 1.50 |

$f/f_1 = 1.32$, $f/|f_2| = 0.849$, $\Delta A/\Delta B = 1.67 (\beta = -0.5)$, $1.47 (\beta = -1.0)$

TABLE 9

[Embodiment 9]

$f = 100$ $F_{No.} = 2.83$

| | radius of curvature | axial distance | refractive index (Nd) | Abbe number |
|---|---|---|---|---|
| $r_1$ | −760.653 | | | |
| | | $d_1$ 3.20 | $N_1$ 1.51680 | $\nu_1$ 64.20 |
| $r_2$ | −118.661 | | | |
| | | $d_2$ 0.15 | | |
| $r_3$ | 39.369 | | | |
| | | $d_3$ 5.00 | $N_2$ 1.69100 | $\nu_2$ 54.75 |
| $r_4$ | 145.979 | | | |
| | | $d_4$ 0.15 | | |
| $r_5$ | 26.674 | | | |
| | | $d_5$ 5.51 | $N_3$ 1.69100 | $\nu_3$ 54.75 |
| $r_6$ | 74.864 | | | |
| | | $d_6$ 0.32 | | |
| $r_7$ | 93.138 | | | |
| | | $d_7$ 2.50 | $N_4$ 1.74000 | $\nu_4$ 31.72 |
| $r_8$ | 20.313 | | | |
| | | $d_8$ 5.40 | | |
| $r_9$ | 180.278 | | | |
| | | $d_9$ 2.50 | $N_5$ 1.69680 | $\nu_5$ 56.47 |
| $r_{10}$ | 52.453 | | | |
| | | $d_{10}$ 7.90 | | |
| $r_{11}$ | −25.304 | | | |
| | | $d_{11}$ 3.50 | $N_6$ 1.83400 | $\nu_6$ 37.05 |
| $r_{12}$ | −25.989 | | | |
| | | $d_{12}$ 24.00 | | |
| $r_{13}$ | −25.760 | | | |
| | | $d_{13}$ 3.50 | $N_7$ 1.80741 | $\nu_7$ 31.59 |
| $r_{14}$ | −31.441 | | | |
| | | $d_{14}$ 0.15 | | |
| $r_{15}$ | 113.660 | | | |
| | | $d_{15}$ 4.00 | $N_8$ 1.51680 | $\nu_8$ 64.20 |

TABLE 9-continued

[Embodiment 9]

| $r_{16}$ | −81.253 | | | |
|---|---|---|---|---|
| magnification | focal length | object distance | $d_8$ | $d_{12}$ |
| −0.5 | 97.1 | −267.0 | 17.54 | 11.86 |
| −1.0 | 93.1 | −170.8 | 28.31 | 1.09 |

$f/f_1 = 1.32$, $f/|f_2| = 0.754$
$\Delta A/\Delta B = 1.52 (\beta = -0.5)$, $1.47 (\beta = -1.0)$

TABLE 10

[Embodiment 10]

$f = 100$ $F_{No.} = 2.83$

| | radius of curvature | axial distance | refractive index (Nd) | Abbe number |
|---|---|---|---|---|
| $r_1$ | 342.425 | | | |
| | | $d_1$ 3.70 | $N_1$ 1.58913 | $\nu_1$ 61.11 |
| $r_2$ | −151.492 | | | |
| | | $d_2$ 0.15 | | |
| $r_3$ | 36.925 | | | |
| | | $d_3$ 5.50 | $N_2$ 1.69680 | $\nu_2$ 56.47 |
| $r_4$ | 170.158 | | | |
| | | $d_4$ 0.15 | | |
| $r_5$ | 28.844 | | | |
| | | $d_5$ 5.30 | $N_3$ 1.72000 | $\nu_3$ 50.31 |
| $r_6$ | 160.890 | | | |
| | | $d_6$ 0.35 | | |
| $r_7$ | 233.478 | | | |
| | | $d_7$ 2.50 | $N_4$ 1.80741 | $\nu_4$ 31.59 |
| $r_8$ | 21.069 | | | |
| | | $d_8$ 6.00 | | |
| $r_9$ | −194.459 | | | |
| | | $d_9$ 1.50 | $N_5$ 1.77250 | $\nu_5$ 49.77 |
| $r_{10}$ | 62.842 | | | |
| | | $d_{10}$ 8.00 | | |
| $r_{11}$ | −34.816 | | | |
| | | $d_{11}$ 3.50 | $N_6$ 1.67339 | $\nu_6$ 29.25 |
| $r_{12}$ | −23.916 | | | |
| | | $d_{12}$ 1.56 | | |
| $r_{13}$ | −21.561 | | | |
| | | $d_{13}$ 3.00 | $N_7$ 1.77250 | $\nu_7$ 49.77 |
| $r_{14}$ | −26.074 | | | |
| | | $d_{14}$ 22.00 | | |
| $r_{15}$ | −25.404 | | | |
| | | $d_{15}$ 2.50 | $N_8$ 1.80741 | $\nu_8$ 31.59 |
| $r_{16}$ | −39.307 | | | |
| | | $d_{16}$ 0.15 | | |
| $r_{17}$ | −73.144 | | | |
| | | $d_{17}$ 3.50 | $N_9$ 1.51680 | $\nu_9$ 64.12 |
| $r_{18}$ | −31.941 | | | |
| | | $d_{18}$ 0.15 | | |
| $r_{19}$ | 65.787 | | | |
| | | $d_{19}$ 3.00 | $N_{10}$ 1.51680 | $\nu_{10}$ 64.12 |
| $r_{20}$ | 607.223 | | | |

| magnification | focal length | object distance | $d_8$ | $d_{14}$ |
|---|---|---|---|---|
| −0.5 | 98.5 | −258.9 | 13.39 | 27.66 |
| −1.0 | 92.8 | −161.6 | 14.62 | 0.35 |

$f/f_1 = 1.55$, $f/|f_2| = 0.923$,
$\Delta A/\Delta B = 1.25 (\beta = -0.5)$, $1.54 (\beta = -1.0)$

What is claimed is:

1. A telephoto lens system, comprising from the object side to the image side:
   a first lens group of a positive refractive power;
   a second lens group of a negative refractive power having a first air space formed between the first and second lens groups; and
   a third lens group of a positive refractive power having a second air space formed between the second and third lens groups;
   wherein all of the first to third lens groups are shiftable along the optical axis in a focusing operation while enlarging the first air space and decreasing the second air space when focusing is effected from infinity to a short distance;
   and wherein the lens system fulfills the following conditions:

$1.1 < f/f_1 < 1.7$ $0.15f < D_{23} < 0.4f$ wherein:
   f represents a focal length of the whole lens system in an infinity focusing condition;
   $f_1$ represents a focal length of the first lens group; and
   $D_{23}$ represents an axial distance of the second air space formed between the second and third lens group in an infinity focusing condition.

2. The invnetion of claim 1, wherein the lens system further fulfills the following conditions:

$0.35 < f/f_{12} < 0.85$ $1.2 < f_{23}/f < 5.0$ wherein:
   $f_{12}$ represents a compound focal length of the first and second lens groups in an infinity focusing condition;
   and
   $f_{23}$ represents a compound focal length of the second and third lens groups in an infinity focusing condition.

3. The invention of claim 1, wherein the first lens group includes, from the object side, two positive lens elements and one negative lens element, the second lens group includes, from the object side, one negative lens element and one positive lens element, and the third lens group includes, from the object side, one positive lens element and one negative lens element.

4. The invention of claim 1, wherein the second lens group includes at least a positive meniscus lens element having convex image side surface, and the third lens group includes at least a negative meniscus lens element having convex image side surface.

5. A telephoto lens system, comprising from the object side to the image side:
   a first lens group of a positive refractive power;
   a second lens group of a negative refractive power having a first air space formed between the first and second lens groups; and
   a third lens group of a positive refractive power having a second air space formed between the second and third lens groups;
   wherein all of the first to third lens groups are shiftable along the optical axis in a focusing operation while enlarging the first air space and decreasing the second air space when focusing is effected from infinity to a short distance;
   and wherein the lens system fulfills the following conditions:

$1.1 < f/f_1 < 1.8$ $0.5 < f/|f_2| < 1.5$ wherein:
   f represents a focal length of the whole lens system in an infinity focusing condition;
   $f_1$ represents a focal length of the first lens group; and $f_2$ represents a focal length of the second lens group.

6. The invention of claim 5, wherein the lens system further fulfills the following conditions:

$$0.95 < \Delta A / \Delta B < 2.5$$

wherein: $\Delta A$ represents a lens shifting distance of the first lens group in a focusing operation from an infinity focusing condition to a proximity focusing condition; and $\Delta B$ represents a lens shifting distance of the second lens group in the focusing operation.

7. A telephoto lens system, comprising from the object side to the image side:
   a first lens group of a positive refractive power;
   a second lens group of a negative refractive power having a first air space formed between the first and second lens groups; and
   a third lens group of a positive refractive power having a second air space formed between the second and third lens groups;
   wherein all of the first to third lens groups are shiftable along the optical axis in a focusing operation while enlarging the first air space an decreasing the second air space when focusing is effected from infinity to a short distance;
   and wherein the lens system fulfills the following conditions:

$$0.15f < D_{23} < 0.4f$$

wherein:
   f represents a focal length of the whole lens system in an infinity focusing condition; and
   $D_{23}$ represents an axial distance of the second air space formed between the second and third lens group in an infinity focusing condition.

8. The invention of claim 7, wherein the first lens group includes two positive lens elements and one negative lens element, the second lens group includes one negative lens element and one meniscus lens element having convex image side surface, and the third lens group includes one positive lens element and one negative lens element.

9. The invention of claim 8 comprising the following design parameters:

| | f = 100 | | $F_{No.}$ = 2.83 | | |
|---|---|---|---|---|---|
| $r_1$ | −526.906 | | | | |
| | | $d_1$ | 3.20 | $n_1$ | 1.51823 | 1 | 58.96 |
| $r_2$ | −112.249 | | | | |
| | | $d_2$ | 0.15 | | |
| $r_3$ | 38.629 | | | | |
| | | $d_3$ | 5.00 | $n_2$ | 1.69100 | 2 | 54.75 |
| $r_4$ | 144.829 | | | | |
| | | $d_4$ | 0.15 | | |
| $r_5$ | 26.209 | | | | |
| | | $d_5$ | 5.50 | $n_3$ | 1.69100 | 3 | 54.75 |
| $r_6$ | 74.864 | | | | |
| | | $d_6$ | 0.33 | | |
| $r_7$ | 93.593 | | | | |
| | | $d_7$ | 2.50 | $n_4$ | 1.74000 | 4 | 31.72 |
| $r_8$ | 19.714 | | | | |
| | | $d_8$ | 5.00 | | |
| $r_9$ | 212.931 | | | | |
| | | $d_9$ | 2.50 | $n_5$ | 1.69680 | 5 | 56.47 |
| $r_{10}$ | 51.495 | | | | |
| | | $d_{10}$ | 8.70 | | |
| $r_{11}$ | −25.443 | | | | |
| | | $d_{11}$ | 3.38 | $n_6$ | 1.83400 | 6 | 37.05 |
| $r_{12}$ | −26.167 | | | | |
| | | $d_{12}$ | 24.00 | | |
| $r_{13}$ | −27.741 | | | | |
| | | $d_{13}$ | 2.80 | $n_7$ | 1.80741 | 7 | 31.59 |
| $r_{14}$ | −33.723 | | | | |
| | | $d_{14}$ | 0.15 | | |
| $r_{15}$ | 133.487 | | | | |
| | | $d_{15}$ | 4.00 | $n_8$ | 1.58913 | 8 | 61.11 |
| $r_{16}$ | −80.018 | | | | |
| magnification | focal length | object distance | $d_8$ | $d_{12}$ |
| −0.5 | 96.9 | −266.4 | 18.36 | 10.64 |
| −1.0 | 93.2 | −171.0 | 27.50 | 1.50 |

* * * * *